(12) United States Patent
Gurocak et al.

(10) Patent No.: US 9,109,650 B2
(45) Date of Patent: Aug. 18, 2015

(54) LINEAR MR-BRAKE AS A HIGH FORCE AND LOW OFF-STATE FRICTION ACTUATOR

(71) Applicant: Washington State University, Pullman, WA (US)

(72) Inventors: Hakan Gurocak, Vancouver, WA (US); Mustafa Alkan, Ankara (TR)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 14/251,141

(22) Filed: Apr. 11, 2014

(65) Prior Publication Data

US 2014/0332331 A1    Nov. 13, 2014

Related U.S. Application Data

(60) Provisional application No. 61/811,236, filed on Apr. 12, 2013.

(51) Int. Cl.
   *F16D 57/00*    (2006.01)
   *F16D 63/00*    (2006.01)
   *F16F 9/53*     (2006.01)

(52) U.S. Cl.
   CPC ............ *F16D 57/002* (2013.01); *F16D 63/008* (2013.01); *F16F 9/535* (2013.01)

(58) Field of Classification Search
   CPC ........ F16F 9/535; F16F 13/305; F16D 57/002
   USPC .............................................. 188/267–267.2
   See application file for complete search history.

(56) References Cited

U.S. PATENT DOCUMENTS

| | | | | |
|---|---|---|---|---|
| 8,387,420 | B2 * | 3/2013 | Kawabata et al. | 68/12.06 |
| 8,757,335 | B2 * | 6/2014 | Kaneda et al. | 188/267.2 |
| 8,851,247 | B2 * | 10/2014 | Shiga | 188/267.2 |
| 2004/0262106 | A1 * | 12/2004 | Manecke et al. | 188/267.2 |
| 2010/0300819 | A1 * | 12/2010 | Hiemenz et al. | 188/267.2 |

FOREIGN PATENT DOCUMENTS

JP          2006-057766    *    3/2006

* cited by examiner

*Primary Examiner* — Vishal Sahni
(74) *Attorney, Agent, or Firm* — Whitham Curtis Christofferson & Cook, PC

(57) ABSTRACT

A novel method and apparatus is introduced to provide a new and robust alternative design for linear magnetorheological (MR) brakes, i.e. MR-brakes. The novel embodiments herein combines a serpentine flux path concept to eliminate conventional piston-cylinder arrangements and as a beneficial result when coupled with the linear brake embodiment disclosed herein, significantly reduce off-state friction and facilitates such devices to provide longer stroke length (i.e., infinite stroke lengths) beyond that as provided in conventional systems. The present linear brake embodiments disclosed herein thus provides, for example, for a ratio of the off-state friction force to the maximum force output at about 3% compared to 10% up to about 27% for similar conventional/commercial brake mechanisms. At the same time, the compactness is beneficially improved be being about half the size of a commercially available product.http://en.wikipedia.org/wiki/File:Paul_Patent_2939952_Fig5.gif.

11 Claims, 10 Drawing Sheets

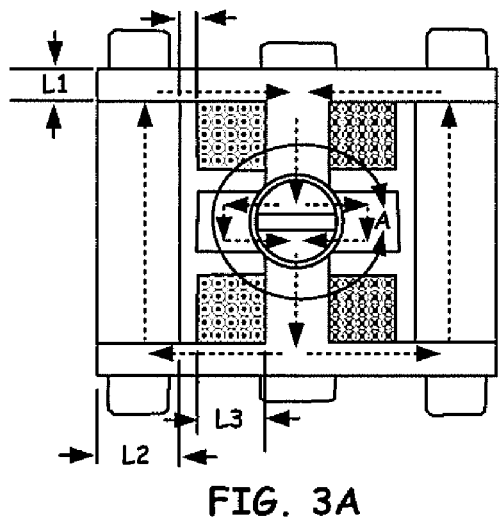
FIG. 3A
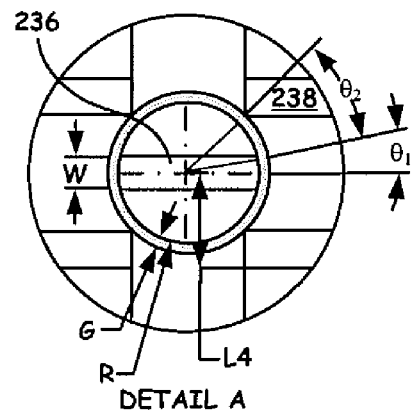
DETAIL A
FIG. 3B
| Parameter | Value |
|---|---|
| R | 3.175 mm |
| $L_1$ | 1.854 mm |
| $L_2$ | 6.350 mm |
| $L_3$ | 5.130 mm |
| $L_4$ | 4.064 mm |
| $\theta_1$ | 7.6° |
| $\theta_2$ | 33.7° |
| No. of Coil Turns (for one side) | 250 turns |
| Max. force output | 170 N (theoretical) 173.4 N (experimental) |
| Max. Current | 1A |
FIG. 3C (a) (b)

LINEAR MR-BRAKE AS A HIGH FORCE AND LOW OFF-STATE FRICTION ACTUATOR

CROSS-REFERENCE TO RELATED APPLICATIONS

The present application claims under 35 U.S.C. §119, the priority benefit of U.S. Provisional Application No. 61/811,236, filed Apr. 12, 2013, entitled: "Linear MR-Brake with Serpentine Flux Path as A High Force and Low Off-State Friction Actuator for Haptics." The disclosure of the foregoing application is incorporated herein by reference in its entirety.

BACKGROUND OF THE INVENTION

1. Field of the Invention

The present invention relates to the field of brakes, dampers, actuators, resistance devices and motion control devices. More particularly, the present invention relates to devices employing a magnetic serpentine flux path and a responsive material for controlling torque/force in linear (non-piston-cylinder) configured braking systems.

2. Discussion of the Related Art

Controllable materials (e.g., fluids, powders, etc.), as utilized herein, exhibit a change in their rheological behavior (mainly their apparent viscosity) upon the application of an external magnetic or electric field. In particular, the controllable material exhibits a rheology change, i.e., an increase in viscosity or resistance to shear, upon being exposed to a magnetic field. The greater the magnitude of the magnetic field passing through the field controllable material, the higher the shear stress or torque that can be achieved by the MR configured device. The controllable materials themselves are often non-colloidal (i.e. non-homogeneous) suspensions of polarizable small particles that form chain like structures upon the application of the external field. The particle chains are parallel to the field direction and restrict the fluid flow, requiring a minimum field dependent shear stress (called yield stress) for the flow to be initiated. Such controllable materials, often fluids, are respectively referred to herein in a non-limiting manner as magneto-rheological (MR) fluids, and devices that incorporate such fluids, as utilized herein, may be referred to as magneto-rheological devices, field controllable devices, MR-devices, MR-Dampers, or in particular, MR-Brakes.

During the past few decades, the popularity of magneto-rheological (MR) fluids in the industry has been increasing dramatically. MR-brakes, for example, utilize such fluids to enable a braking torque/force by controlling its viscosity. The fluid is normally similar to low viscosity oil but it becomes a thick medium upon exposure to magnetic flux. MR-brakes (MR-dampers, MR-actuators) are quite popular in many applications including prosthetics, automotive, and vibration stabilization owing to the desirable characteristics, such as high force-to-volume ratio, inherent stability, and simple interface between the mechanical and a coupled electrical system. Force-feedback robotics and (haptic) interfaces (the use of the sense of touch in a user interface design to provide information to an end user) also benefit from the high compactness and high torque capabilities of MR-brakes.

MR-brakes in particular, conventionally employ a coil embedded in the piston. In such a design, the magnetic flux goes through a large cross-sectional area reducing the resulting flux density. The only options in the typical configuration(s) to obtain high magnetic flux density on the controllable fluid are to increase the rod radius, coil windings and current. All of these options lead to bulkier designs.

FIG. 1A shows a three dimensional perspective of such an existing (i.e., conventional) "piston" linear MR-brake (generally referenced by the numeral 10) design similar to an ordinary shock absorber. FIG. 1B illustrates the same "piston" linear MR-brake 10 device but now shown as a sectional view configured in a brake assembly (now generally referenced by the numeral 20). As shown in FIG. 1A, the piston 12, having a length (denoted as L) and a diameter (denoted as $D_P$) is directly coupled to an inner diameter rod 14 having a diameter denoted $D_r$, that moves along with the piston 12 as known to those skilled in the art in such conventional designs.

To explain the movement aspect, FIG. 1B shows the piston 12, rod 14 arrangement now disposed within a housing 16 of the overall brake assembly 20. In these designs, the inner chamber 22 in a shock absorber operation is filled with a desired MR-fluid (not specifically denoted) instead of a viscous oil and the piston 12 is modified to generate a magnetic field by means of a built-in coil 24, as also shown in FIG. 1A. The wall of inner chamber 22 of the housing 16 is configured as the cylinder 28 of the housing and in operation, the piston 12 disposed within the housing cylinder 28 moves linearly along a direction when the MR-fluid is subjected to magnetic fields 26 (as also denoted as arrows) as provided by desired applied currents directed through coil 24. Importantly, the stroke length is such a device is limited by the inner chamber 22 of the housing 16.

The key point to be taken by FIGS. 1A and 1B is that conventionally, operation of such piston-cylinder configurations, i.e., linear MR-brakes currently available on the market and literature, operate in the "flow mode" and thus are able to produce relatively large forces, but the piston-cylinder arrangement in the brake design amplifies the friction force at the fluid gap to a large pressure difference between the faces of the piston. This leads to a significant off-state force which is uncontrollable and is in addition to that what the actuator (i.e., the housing arrangement discussion for FIG. 1B) applies even when the input current is turned off. Such a force is undesirable in many applications, especially in haptics. For example, such an undesirable off-state force (as coupled to a haptic interface that implements such actuators), keeps applying forces on the user's hand even when the user is not interacting with objects in a virtual simulation environment, hence reducing the realism of the interaction.

Accordingly, there is a need in the field of magneto-rheological (MR) devices for a new non-cylinder-piston linear MR-brake configuration that operates in the shear mode of which can be used for any stroke requirement without size modification in the actuator body. Such a desired design would provide for a wide application area and a greater flexibility based in design, including but not strictly limited to, haptic interface designs. The present invention addresses such a need.

SUMMARY OF THE INVENTION

The present application is directed to a novel compact linear MR-brake with infinite stroke and minimal off-state friction force. Employing the serpentine flux path methodology increased the force output of the device. In this approach, the magnetic flux is woven through the MR-fluid multiple times activating more of the fluid.

A first aspect of the present application is directed to a magnetorheological apparatus that includes: a rod configured with a constant diameter along the length of the rod; a housing configured with an axial bore therein, the bore being slightly greater in diameter than the rod so as to circumscribe the rod; wherein the housing is further configured with conductive and nonconductive materials to provide a plurality of serpentine magnetic flux paths; and a magneto-rheological fluid disposed therebetween the rod and the housing, wherein linear movement of the rod along the axial bore is controlled by application of a magnetic field to the disposed magneto-rheological fluid by way of the plurality of serpentine magnetic flux paths.

A second aspect of the present application is directed to a magneto-rheological (MR) method of operation that includes: providing a rod configured with a constant diameter along the length of the rod; providing a housing configured with an axial bore therein, the bore being slightly greater in diameter than the rod so as to circumscribe the rod; wherein the housing is further configured with conductive and non-conductive materials to provide a plurality of serpentine magnetic flux paths; inducing a magnetic flux to flow along the conductive materials in the housing; directing the magnetic flux to flow through a fluid gap configured with magneto-rheological (MR) fluid; impeding the magnetic flux flow by way of a non-conductive material disposed along the length of the central axis of the rod; directing the magnetic flux flow back through the fluid gap, wherein the magnetic flux flow is thereafter impeded by the non-conductive material configured in the housing; and directing the magnetic flux flow back through the fluid gap and along flow paths provided by the conductive material housing, wherein the magnetic flux flow is directed multiple times through the MR-fluid residing in the fluid gap so as to provide the plurality of serpentine magnetic flux paths and enable linear control of the rod.

Accordingly, the present invention provides for a new linear brake with, for example, a minimized off-state friction force of less than about 5.4 N. This is about 3% of the up to at least 170 N fully activated force of the device. The size of the brake is reduced with the serpentine magnetic flux path methodology. Further reduction in the off-state force can be beneficially obtained by applying a reverse current pulse to remove the residual magnetic field in the brake. As side benefits, such configurations and methods disclosed herein reduces overall cost while improving robustness.

BRIEF DESCRIPTION OF THE DRAWINGS

FIG. 3A shows an example embodiment being enabled according to design parameters.

FIG. 3B shows details of the inscribed section A as illustrated in FIG. 3A.

FIG. 3C shows a table listing example design parameters for an exemplary embodiment of the present application.

DETAILED DESCRIPTION

Figure 1A:
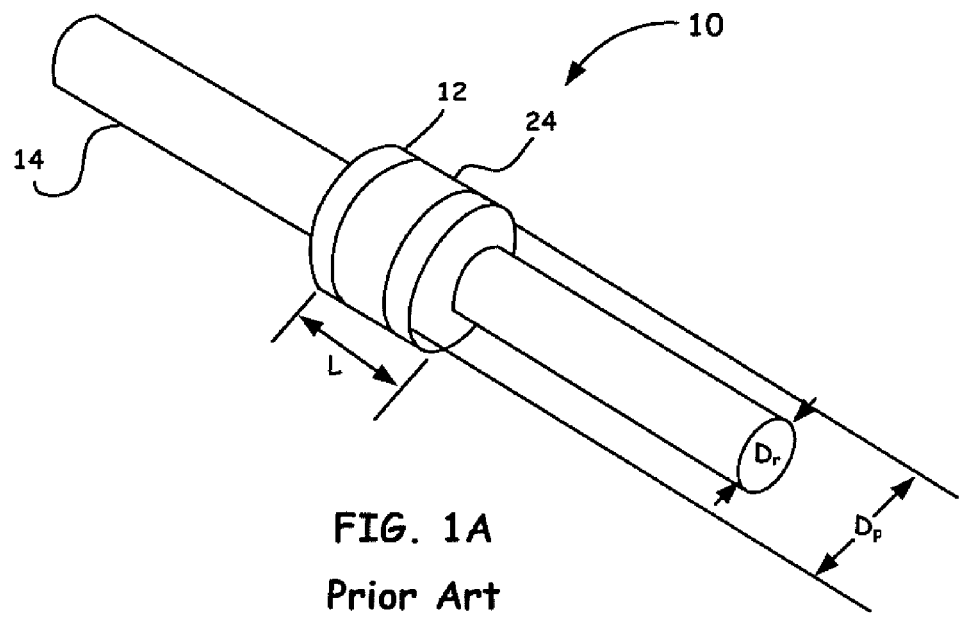
FIG. 1A shows a three dimensional perspective of conventional MR-brake.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

The main contribution of this research is a new alternative internal apparatus for linear MR-brakes. The novel embodiments herein beneficially use a serpentine flux path concept to eliminate the conventional piston-cylinder arrangement. Such novel configurations lead to significantly less off-state friction and facilitates devices with infinite stroke. The serpentine flux path concept was formerly introduced for rotary MR-brakes (Blake and Gurocak, 2009). This approach enables activation of the whole MR-fluid on the contact surface with a smaller magneto-motive force by weaving the magnetic flux through the MR-fluid multiple times.

Accordingly, the novel configurations and methods disclosed herein form the basis of the present invention, wherein by using the serpentine flux path but in a novel fashion as coupled to the linear (non-piston-cylinder) configuration, the present invention provides surprising non-obvious results in that the ratio of the off-state friction force to the maximum force output in linear brake device disclosed herein is about 3% compared to more than 10% for similar devices in the literature and 27% for a commercial brake. At the same time and beneficially, the compactness is improved as to about half the size of a commercially available product.

Specific Description

New Linear Brake without a Piston

MR-fluids are commonly modeled using either Herschel-Bulkley or Bingham plastic models. The main difference between these models is in how they account for the contribution of the shear rate to the resulting shear stress. Here, the Bingham plastic model was selected due to its simplicity. The governing equation for this model is:

$$\tau = \tau_{yd}(B) + \eta \gamma \quad (1)$$

where $\tau_{yd}$ is the dynamic yield stress, depending on the magnetic flux. The second term in this equation is the shear stress related to the motion where $\eta$ is the plastic viscosity and $\gamma$ is the shear rate. Significant part of the force consists of the dynamic yield stress acting on the contact surface covered by the MR-fluid. This corresponds to the first term in Equation (1). The second term in the equation is the uncontrollable shear stress contribution, which is the source of the friction force when the device is turned off (off-state). The shear rate depends on the relative speed of the two moving surfaces and the thickness of the MR-fluid gap between the surfaces ($\gamma$=velocity/fluid gap).

Figure 1B:
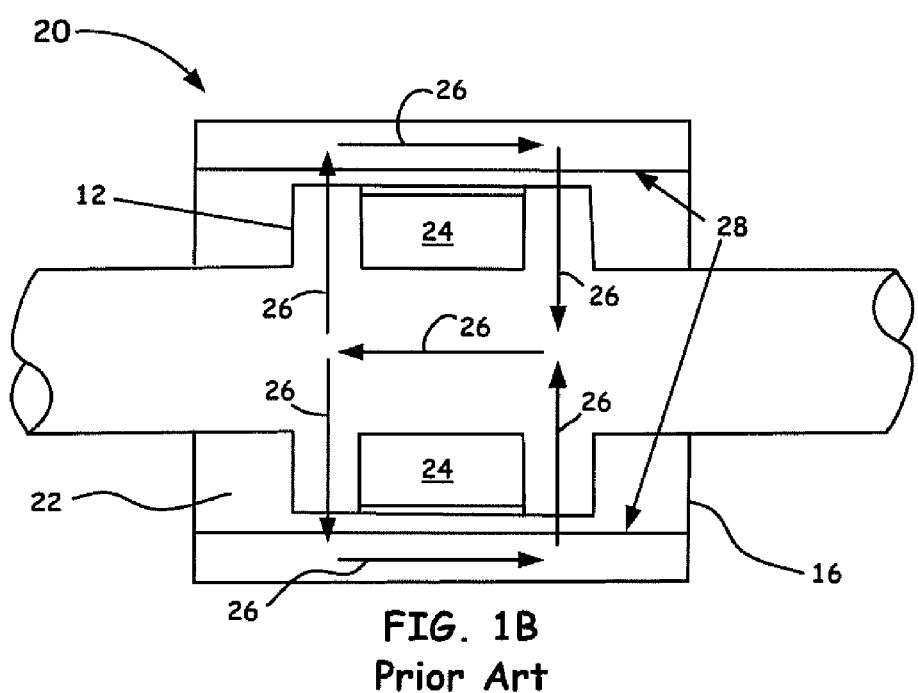
FIG. 1B shows a sectional perspective of the "piston" MR-brake assembly.
Figure 2A:
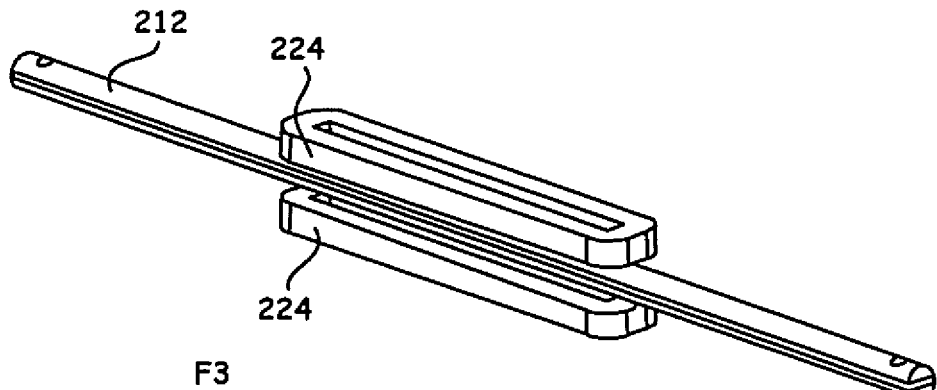
FIG. 2A shows a general representation of the magnetic field generators configured about the rod of the present application.
Figure 2B:
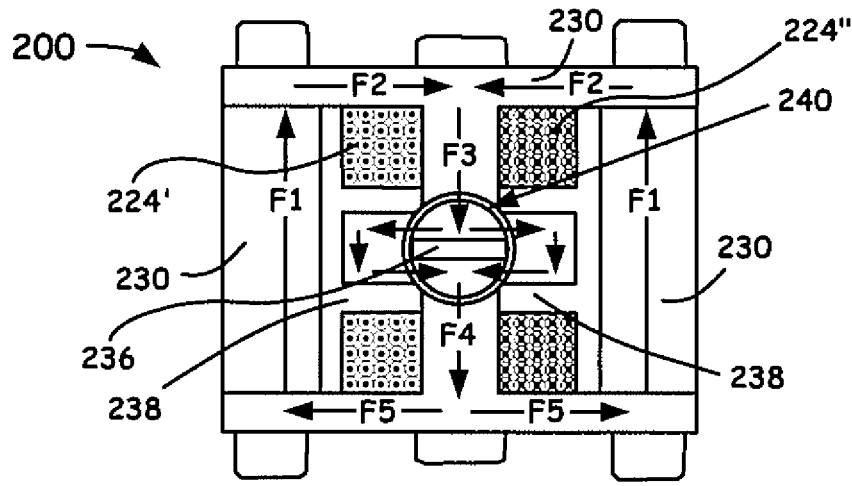
FIG. 2B shows a cross-sectional perspective of the actuator illustrating the serpentine flux path as directed through the rod and the housing case.
Figure 2C:
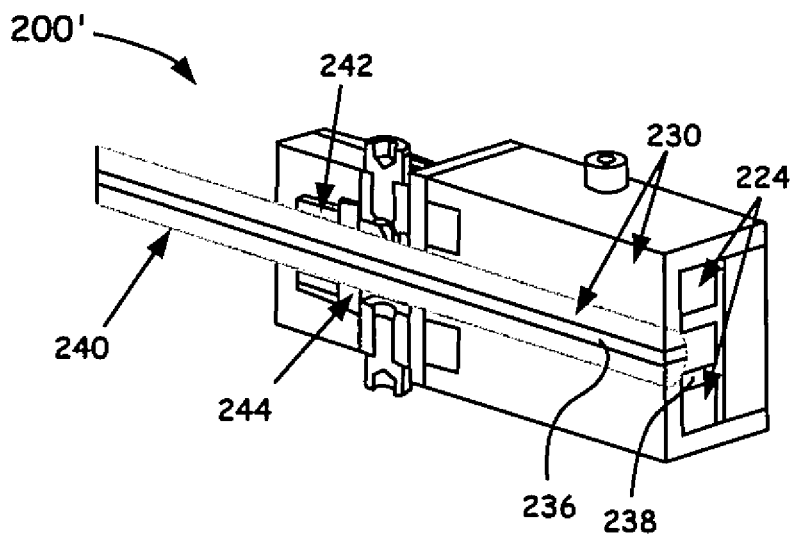
FIG. 2C shows the MR-Brake overall assembly showing the MR-fluid in the gap being activated by the coils.

In haptics applications as to be utilized by the embodiments herein, it is desirable to have low off-state forces. Hence, the viscous forces in the linear brake need to be minimized. To achieve this, the piston found in conventional systems, as shown FIG. 1A and FIG. 1B, is removed and in its place, but in a novel fashion as disclosed herein, a constant diameter rod is utilized, as shown in FIG. 2A and FIG. 2C, as to be discussed below. This has a beneficial aspect of eliminating and/or minimizing the viscous force that is otherwise to be applied to a conventional piston configuration due to the pressure difference across it.

For preliminary design considerations to provide for a desired linear MR-Brake apparatus without a piston, the off-state viscous friction force is estimated with respect to the worst case considering the maximum speed that the rod could attain. For example, if the largest speed requirement is considered as 300 mm/sec, then the shear rate for such an example speed is found from $\gamma$=velocity (300 mm/s)/fluid gap (0.01 in) as 1184 $s^{-1}$. The fluid shear stress for this shear rate is given as 230 Pa as provided by a manufacturing datasheet. Then, the force over the contact area is computed as 0.43 N. On the other hand, when the brake is turned on, the shear stress of the fluid is given as 106 kPa in the datasheet, which corresponds to 170 N of force over the contact area. Therefore, the off-state viscous friction force due to the plastic viscosity of the MR fluid in the second term of Equation (1) can be neglected compared to the on-state. Hence, including the Coulomb friction from the seals and bushings, the total braking force can be written as:

$$F = 2\pi \cdot r \cdot L \cdot \tau_{yd}(B) + F_{Coulomb} \quad (2)$$

where $\tau_{yd}$ (B) is the MR-fluid yield stress as a function of magnetic flux B, r is the radius of the rod, L is the length of the active area of the rod, and $F_{Coulomb}$ is the mechanical friction force (mainly from seals and bushings).

Serpentine Flux Path

In the embodiments disclosed herein, magnetically non-conductive materials, such as, for example, aluminum sections and magnetically conductive materials, such as, but not limited to steel (preferably 1018 steel) materials are employed along with two beneficially configured coils positioned horizontally above and below the rod. The geometric configuration of the conductive and non-conductive materials are strategically arranged to bend the magnetic field and weave it through the MR-fluid gap multiple times to expose more of the fluid to the flux. Therefore, the resulting brake is more compact and the braking force is increased without increasing the size of the coils or the rod. The following discussion entails the configurations and serpentine flux path aspects of the embodiments of the present application.

Turning back to the figures, FIG. 2A shows a general representation of the magnetic field generators, e.g., configured coils 224, desirably positioned on sides (shown positioned on the upper and lower sides as an example) of a configured rod 212 of the present application. FIG. 2B shows a side view of the coils (denoted as 224' and 224') configured in the housing 200 of the actuator and FIG. 2C also generally shows the coils 224 configured in the housing with a bushing 242 and seal 244 of the overall actuator assembly 200'. With respect to the seal, the seal 244 can include any suitable seal member adapted to prevent egress of the MR-fluid from within actuator 200'.

Figure 4:
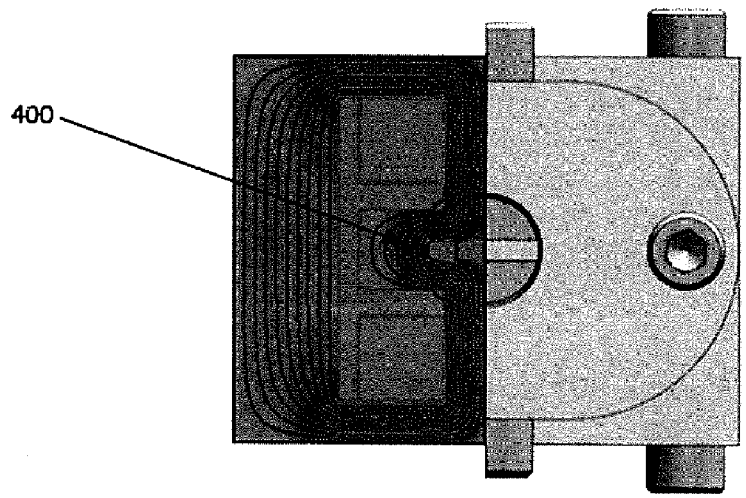
FIG. 4 illustrates Finite Element Analysis (FEA) of the serpentine flux path within an example MR-Brake of the present application.

The coils denoted as 224' and 224" in FIG. 2B are respectively also denoted with encircled dots (i.e., 224') and encircled x's (i.e., 224") to respectively connote a directional winding flow toward and away of the wires that make up the coils 224, as also shown in FIG. 2A and FIG. 2B. As an example non-limiting embodiment, the coils 224 can be formed with 250 turns of 28-gauge enameled magnet wire on both upper and lower sides of the rod 224. The rod 212 itself is often substantially made of, for example, steel to conduct the magnetic field generated by the coils 224. A non-conductive segment 236, such as, but not limited to, aluminum, is disposed therebetween the rod 212, as shown in FIG. 2B, and extending beneficially along the total length of the rod 212, as shown in more detail in FIG. 2C. When provided with current, the coils 224 create a serpentine magnetic flux (e.g., flux path generally denoted as F1, F2, F3, etc., along with accompanying arrows, as shown in FIG. 4) within the housing 200, as shown in FIG. 2B. In particular, the geometric configuration of the conductive 230 material of the housing 200, e.g. steel, and non-conductive materials, 236, 238, e.g., aluminum, is strategically arranged to bend the magnetic field and weave it through the MR-fluid gap 240, as shown in FIG. 2B (also denoted as a greyed in portion), multiple times to expose more of the fluid to the flux.

As a method of operation, when the coils 224 are activated via a desired input current flow by way of control electronics (not shown), magnetic flux (see FIG. 4, ref character 400) is induced that enables the magnetic flux to flow along a conductive path, e.g., F1, F2, and F3, as seen in FIG. 2B, through the fluid gap 240 and thus the MR-fluid. The magnetic flow is then impeded by the non-conductive section 236 configured in the center of the rod 212, turned towards and back through the fluid gap 240, of which is then impeded by non-conductive material 238 configured in the housing 200. The flux path then is directed back through the fluid gap 236 and flow along paths F4 and F5 back along path F1 via conductive material 230. Such a resultant serpentine path provides for a magnetic flux flow multiple times through the MR-fluid residing in fluid gap 240. The presence of the resultant magnetic field causes the MR-fluid to change its rheology resulting in the development of a higher yield stress to induce onset of shearing of the fluid material. Typically, in the absence of a magnetic field, the MR-fluid returns to an unorganized or freely dispersed state and the apparent viscosity or shear flow resistance of the overall fluid is correspondingly reduced. By activating the magnetic field, the field acts on the MR-fluid circumscribing the rod 212 to slow or stop the rod's 212 linear movement.

It is to be noted that the shear stress on the MR-fluid is directly proportional to the magnetic flux generated by the coil, which depends on both the current passing through the magnet wires and the number of turns in the coil. The flux increases with the increase in the number of turns and the amount of current. Both of these can limit the compactness requirement set initially. Since the thickness of the wire needs can be increased in the present embodiments for larger currents to pass, the total size of the coil thus gets larger while keeping the number of turns the same as before. Another exemplary configuration includes using more turns by using a thinner wire for the same range of current with the knowledge that overheating of the wires can be problematic since the total length is increased and the cross sectional area is reduced.

The operation of the actuator 200', as shown generally in FIG. 2C, can be controlled and data can be acquired by a control and data system (not depicted) of various circuitry of a known type, which may be implemented as any one or a combination of general or special-purpose processors (digital signal processor (DSP)), firmware, software to provide instrument control and data analysis for the actuator 200' and/or related instruments, and hardware circuitry configured to execute a set of instructions that embody the prescribed data analysis and control routines of the present invention.

It is also to be appreciated that instructions to activate or deactivate the embodiments herein, and/or the exporting/displaying/outputting the instruments characteristics, etc., may be executed via a data processing based system (e.g., a controller, a computer, a personal computer, etc.), which includes hardware and software logic for performing the aforementioned instructions and control functions.

In addition, such control functions, as described above, can also be implemented as provided by a machine-readable medium (e.g., a computer readable medium). A computer-readable medium, in accordance with aspects of the present invention, refers to non-transitory mediums known and understood by those of ordinary skill in the art, which have encoded information provided in a form that can be read (i.e., scanned/sensed) by a machine/computer and interpreted by the machine's/computer's hardware and/or software.

Fluid Gap

Fluid gap is another important parameter which determines the braking force. As the gap gets smaller, the magnetic flux in the gap becomes larger since the magnetic permeability of the MR-fluid is quite smaller than the low-carbon steel. The magnetic circuit equivalent of the brake can be presented with the following equation:

$$F = \Phi \cdot R \quad (3)$$

where "F" is the magneto-motive force, "Φ" is the magnetic flux, and "R" is the equivalent reluctance of the magnetic circuit loop. The reluctance of each material in the loop can be computed using the following formula:

$$R = \frac{l}{A \cdot \mu} \quad (4)$$

where "l" is the longitudinal distance (which is the fluid gap for MR-fluid), "A" is the sectional area perpendicular to the magnetic flux direction, and "μ" is the magnetic permeability of the material. As it can be seen from the equations, increased fluid gap increases the magnetic reluctance of the MR-fluid in Equation (4), which leads to a smaller magnetic flux (Φ) in Equation (3) provided that the magneto-motive force "F" is kept constant.

FIGS. 3A, 3B and 3C show example but non-limiting design parameters to aid in constructing MR-Brake actuator embodiments, as disclosed herein. FIG. 3B is to be noted as a detailed sectional analysis of the encircled section A, as shown in FIG. 3A. The dashed arrow patterns also shown in FIG. 3A are the magnetic flux flow serpentine path, as described above.

Accordingly, an exemplary rod diameter is initially set to 6.35 mm (i.e., a radius R of 3.175 mm, as shown in FIG. 3C) and a width W, as shown in FIG. 3B, of the non-conductive material in the center of the rod is suggested at 1.27 mm. $L_1$, $L_2$, $L_3$, and $L_4$, as shown in FIG. 3A, FIG. 3B, and FIG. 3C provides example dimensions of the housing of the actuator. $\Theta_1$, as shown in FIG. 3B and FIG. 3C is an angular specification for thickness from the center of the rod out to a corner of the non-conductive material 236 (i.e., aluminum) that is within the rod 212. $\Theta_2$, as shown in FIG. 3B and FIG. 3C is an angular specification for thickness out to a corner of the non-conductive material 238 (i.e., aluminum block material) to aid in creating the serpentine path.

To get a desired force (170 N), the length of the rod 212 is chosen, here it was chosen at 86.36 mm. It is to be noted that the bore (not specifically detailed) in the housing is configured with a diameter "slightly" larger than the diameter of the rod 212 so as to circumscribe the rod. Thus, the bore diameter which is "slightly" larger than the diameter of the rod defines a predetermined narrow fluid gap (i.e., a gap to contain the MR-fluid) therebetween and of which can comprise a radial clearance of at least 0.127. Accordingly, the fluid gap G (radial clearance), for the example embodiment herein is correspondingly 0.254 mm, which resulted in 1.2 Tesla flux on the MR-fluid. The point to appreciate is that while particular dimensions are described above, it is to be noted that input current and other dimensional arrangements can be chosen depending on the design parameters desired. For example, because the strike length is unlimited by the present embodiments, the rod 212 length, while listed above as 86.36 mm, can be much greater in length (e.g., meters) and diameter depending on the application that necessitates a desired force requirement. The same dimensional variations are also true for the fluid gap G, width W, $L_1$, $L_2$, $L_3$, and $L_4$, etc. Even more particular, by utilizing a longer or a shorter rod, but the same actuator casing, the present brake embodiments disclosed herein can fit into any stroke requirement without requiring size modification on the actuator body. This provides great design flexibility as well as an effective solution against bulky form factors in large-stroke applications. Furthermore, the new brake is quite compact as it is about half the cross-sectional area of a commercially available similar device (RD 8040-1 by Lord Corp.). Finally, when compared to the commercial brake, a resultant reduced to practice embodiment, as disclosed herein has only 3% off-state friction versus 8% to 27% in conventional devices, as known to those of ordinary skill in the art.

Figure 5:
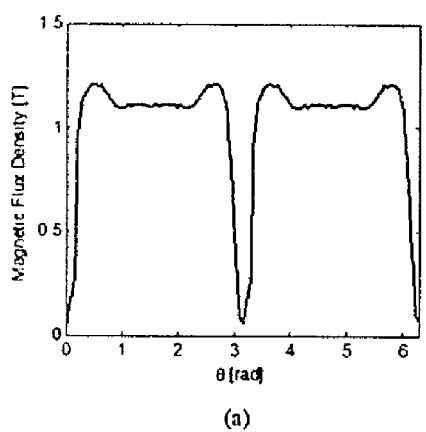
FIG. 5 shows a pair of Finite Element Analysis (FEA) plots of the distribution of the magnetic flux density and shear stress.
Figure 5:
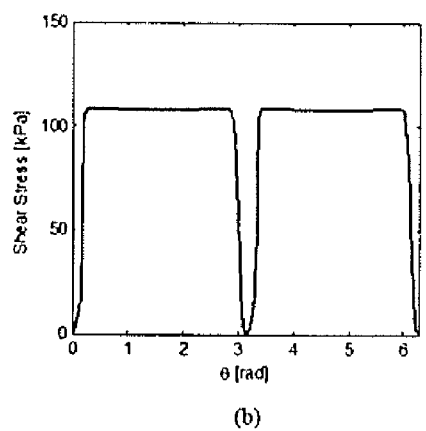

Returning back to the design considerations for a device of the present application with respect to FIG. 3A, FIG. 3B, and FIG. 3C, the shear stress in saturation corresponding to this flux rate is given as 106 kPa in the manufacturer's datasheet. The force is thus calculated using the area of the steel sections on the rod and this shear stress based on Equation (2), as discussed above. The activated fluid surface area is 0.0016 $m^2$. Therefore, the force is about 170 N. A resultant example actuator provided for a maximum force to be about 173.3 N at 1 A current and the Coulomb friction due to the seals as 5.4 N. FIG. 4 shows the resultant magnetic flux density 400 serpentine path over the MR-fluid for the example design while FIG. 5 shows Finite Element Analysis (FEA) results showing the exemplary distribution of magnetic flux density in plot (a), i.e., illustrating a relatively uniform magnetic flux density over the MR-fluid around the rod for a designed resultant MR-Brake actuator with angular position θ starting from the horizontal axis and increasing in the counter clockwise direction. FIG. 5 also shows a plot in (b), illustrating uniformly applied stress generated by the MR-fluid as a function of θ for a beneficial example embodiment disclosed herein.

Figure 6:
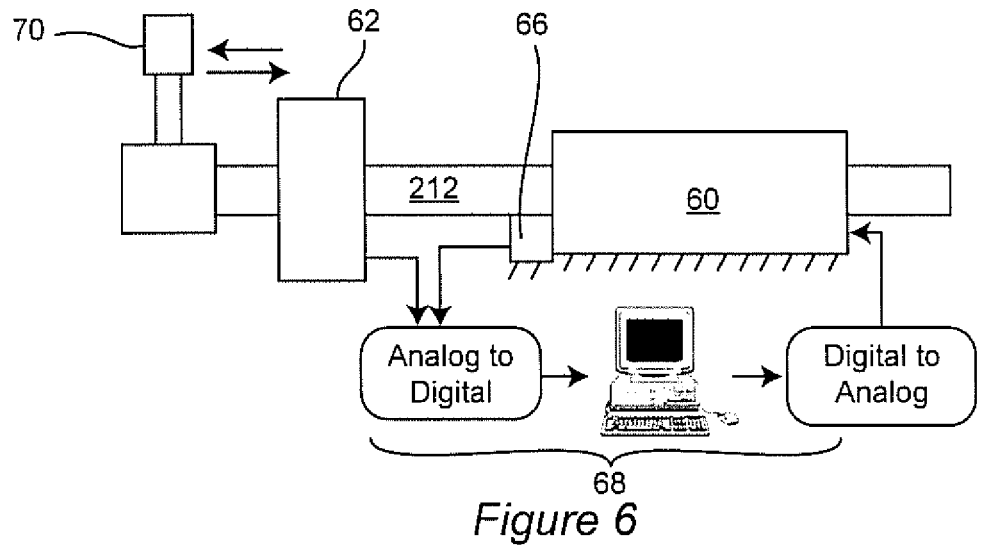
FIG. 6 shows an experimental configuration to assess MR-Brake embodiments, as disclosed herein.

From the above design, a linear MR-brake 60 resulted and tested using the system shown in FIG. 6. The setup included a force transducer 62 (i.e., sensor) from ATI Industrial Automation (mini45-E), and mounted at the end of the rod 212, and a high resolution linear encoder 66 measuring the position of the brake rod 212. Data acquisition entailed a Quanser Q4 Series hardware coupled with MATLAB/SIMULINK via WinCon software 68. The instrumented reduced to practice MR-Brake was the mounted on the table of a CNC apparatus 70 to provide accurately controlled input forces.

Figure 7:
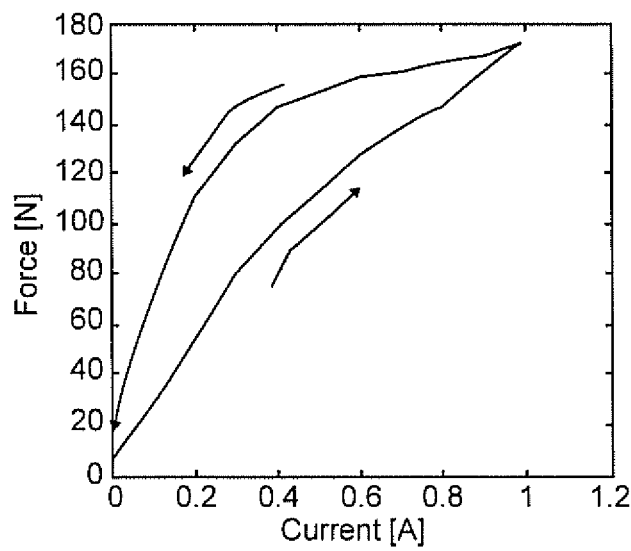
FIG. 7 shows a plot of Braking force as a function of input current when testing example embodiments of the present application.

FIG. 7 shows the beneficial testing results of the reduced to practice MR-Brake. The current is first increased and then decreased showing some hysteresis behavior. In particular, while the current was incremented from zero to 1 A with increments of 0.1 A, the force on the sensor was recorded. Such a change in the force with respect to current is presented in FIG. 7. The minimum force when the current is off and the maximum force at 1 A of a current is noted respectively as 5.4 N and 173.3 N. This results in a dynamic range of around 30.1 dB and 167.9 N controllable force (=173.3−5.4). The controllable range was computed using FEA analysis as 170 N.

Haptics Applications

Figure 8:
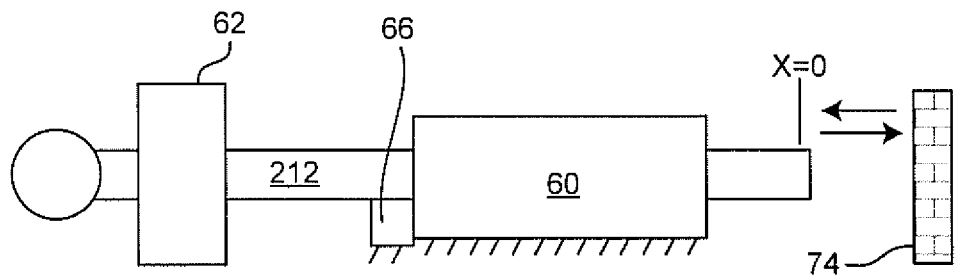
FIG. 8 shows an experimental configuration to assess haptic device applications.
Figure 9A:
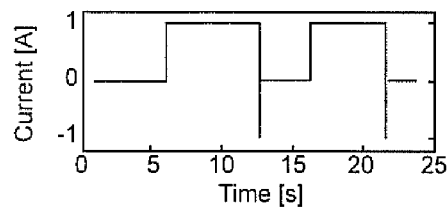
FIG. 9A-D shows simulation plots of collision with a virtual wall without a force sensor so as to assess haptic device applications.
Figure 10A:
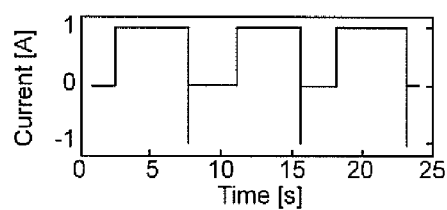
FIG. 10A-D shows simulation plots of collision with a virtual wall using (with) a force sensor so as to assess haptic device applications.
Figure 9B:
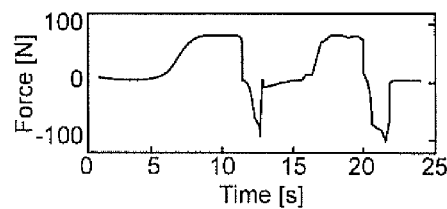
Figure 10B:
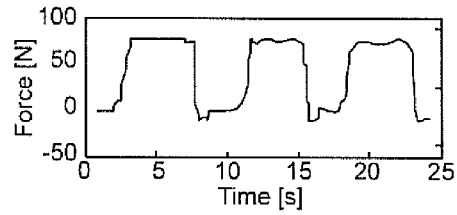
Figure 9C:
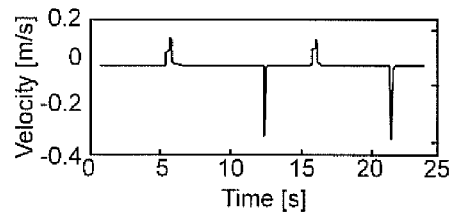
Figure 10C:
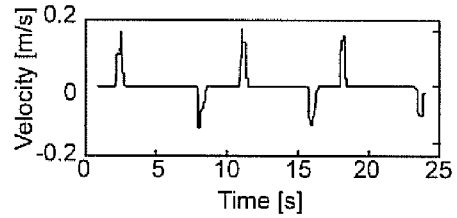
Figure 9D:
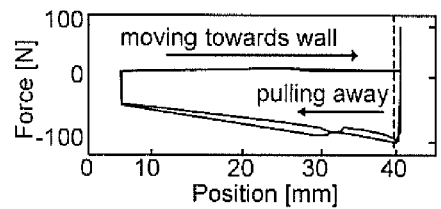
Figure 10D:
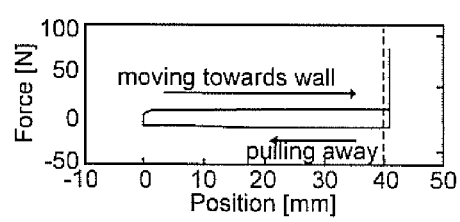
Figure 11A:
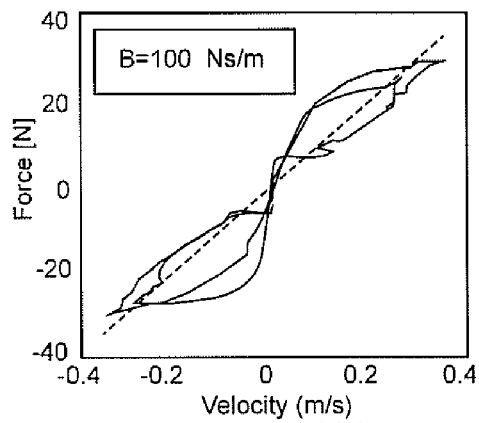
FIG. 11A-D shows a first example case of damping capabilities of a present embodiment by way of plots of force as a function of time, force, velocity, and also current as a function of time using a low input force.
Figure 12A:
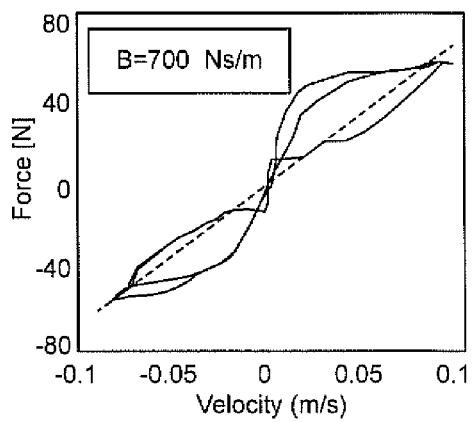
FIG. 12A-D shows a second example case of damping capabilities of a present embodiment by way of plots of force as a function of time, force, velocity, and also current as a function of time using a high input force.
Figure 11B:
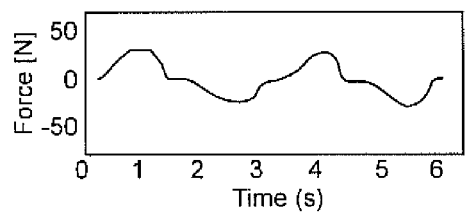
Figure 12B:
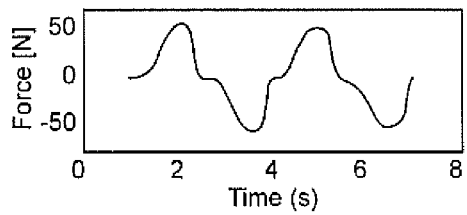
Figure 11C:
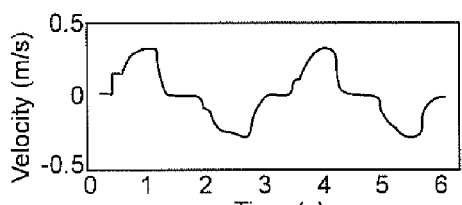
Figure 12C:
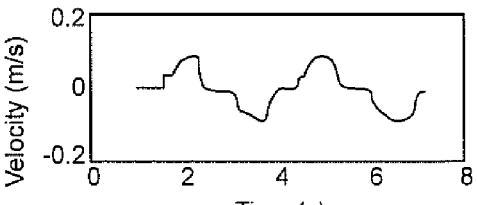
Figure 11D:
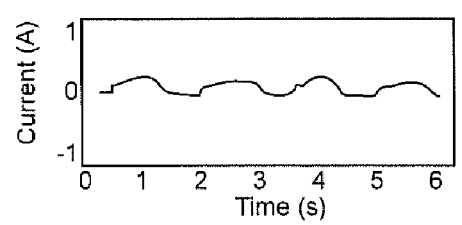
Figure 12D:
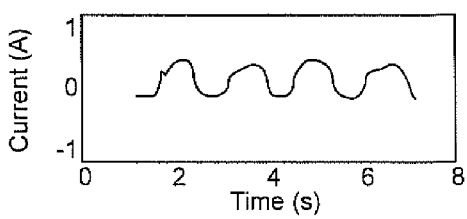

The reduced to practice MR-brake 60 also proved beneficial as a 1-DOF haptic device. FIG. 8 thus shows a similar testing arrangement of a MR-Brake 60 but now as a haptics device. FIG. 8 thus shows a force transducer 62 (i.e., sensor) mounted at the end of the rod 212, and a high resolution linear encoder 66 measuring the position of the MR-brake 60 rod 212. A virtual wall 74 for the configuration is located for this non-limiting example, at x=40 mm. The data acquisition system, similar to that shown in FIG. 6 was set to run at 1000 Hz. The current given to the coils was set to high (1 A) when collision occurred. Two different strategies were followed to carry out this experiment.

In the first case, a force sensor 62, as shown in FIG. 8, was not used. The brake 60 was activated when the end-effector (not detailed) contacted and slightly penetrated into the virtual wall, and deactivated when it was outside the wall. Therefore, results of virtual wall simulation at 40 mm without the force sensor are given in FIG. 9 with results of virtual wall simulation (the second case) at 40 mm with the force sensor are given in FIG. 10.

Specifically, FIG. 9 (with force sensor used in control system) shows (a) input current, (b) force, (c) velocity as a function of time, and (d) force exerted by the end-effector with respect to position. The handle is first pulled away from position of the wall through approximately 35 mm. Then, it is pushed towards the virtual wall for collision simulation. FIG. 10 (without force sensor, i.e., second case) also shows (a) input current, (b) force, (c) velocity as a function of time, and (d) force exerted by the end-effector with respect to position. The handle also is first pulled away from position of the wall through approximately 35 mm, then it is pushed towards the virtual wall for collision simulation.

FIG. 10 thus shows the force sensor being used to detect the direction of the force applied by the user. The control loop for the results shown in FIG. 10 also included demagnetizing, giving a reverse current for a short period of time to surprisingly and in a non-obvious manner, eliminate hysteresis in the brake. The duration for demagnetization was tuned to 0.05 seconds. The MR-brake 60 seemed to have no extra force due to hysteresis after applying this to the control system. Thus, the hysteresis in the present embodiments can be reduced significantly without the need for an expensive force sensor in the control loop. An additional point to take away from the results shown in FIG. 9 and FIG. 10 is that crisp reaction force is surprisingly but beneficially observed at the initial contact in virtual wall collision experiments. During the contact, the brake shows highly rigid response.

Damping Capabilities

The reduced to practice example embodiment herein also underwent testing as a virtual damper. In such testing, variable levels of current is supplied to the brake through a servo amplifier and data acquisition board. For such a system, the desired force can be computed as:

$$F = b \cdot v \quad (5)$$

where "b" denotes the simulated damping ratio, and "v" is the rod velocity.

The beneficial results of the damping experiment illustrated the capability of the device to provide a low and a high damping ratio (100 N·s/m on the left, and 700 N·s/m on the right) as presented in FIG. 11 and FIG. 12. Specifically, FIG. 11 and FIG. 12 (a, b) shows force as a function of velocity. The desired force is shown with a dashed line, wherein the damping ratio is set to 100 N·s/m (a) and 700 N·s/m (b) respectively. The force generated by the reduced to practice device is also shown in FIG. 11 and FIG. 12 (i.e., (c, d), (e, f), (g, h)), illustrating force, velocity and current as a function of time.

Coulomb Friction

This reduced to practice embodiment also underwent Coulomb friction testing to additionally explore haptics applications. A Karnopp model was employed wherein the model uses a velocity threshold value to define static friction range instead of using absolute zero velocity since it is very difficult to obtain absolute zero velocity with the digital encoder systems due to discretization. In order to illustrate the response of the actuator disclosed herein, a sample case was utilized in the model with the velocity-deadband (Δv) at 3 mm/s, the static friction force (Fstatic) at 50 N, and the dynamic friction force (Fdynamic) at 40 N.

Figure 13:
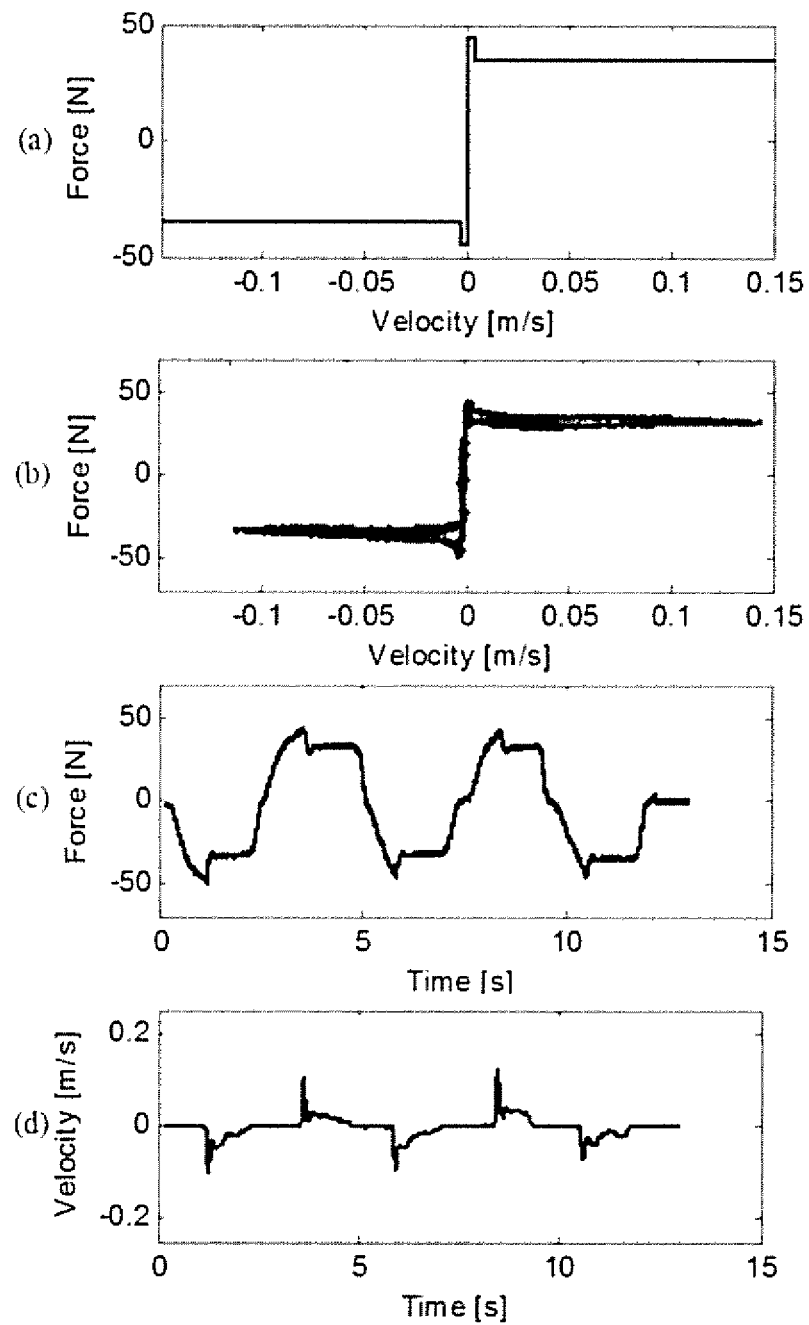
FIG. 13A-D shows plots of Coulomb friction using an example linear MR-brake, as disclosed herein.

FIG. 13 presents results of the Coulomb friction modeled by the linear MR-brake. In particular, FIG. 13 shows (a) desired input force as a function of velocity. The threshold velocity to model change from static to dynamic friction is 3 mm/s while the forces for static and dynamic friction are 50 and 40 N, respectively. FIG. 13 (b) shows a very beneficial plot of the actual force generated by the reduced to practice exemplary device. FIG. 13 (c), (d) shows plots of actual force and velocity as a function of time, respectively.

Transient Response Characteristics

Transient response characteristics and the time constant of the brake was also demonstrated to illustrate the capabilities of the present embodiments. A 25.4 mm/s step input was applied on the brake using the CNC apparatus 70, as discussed above for FIG. 6. It is also desired to explore the effect of input current on the response. The experiment was repeated for current levels of 0.4, 0.6, 0.8, and 1 A. Shortly after the rod started to move, the brake was engaged at these current levels and the responses were captured, as shown in FIG. 14.

Figure 14A:
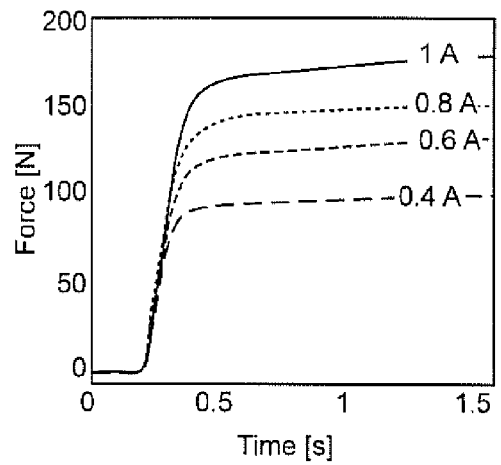
FIG. 14A-B shows transient response and first order plots of an example linear MR-brake, as disclosed herein.
Figure 14B:
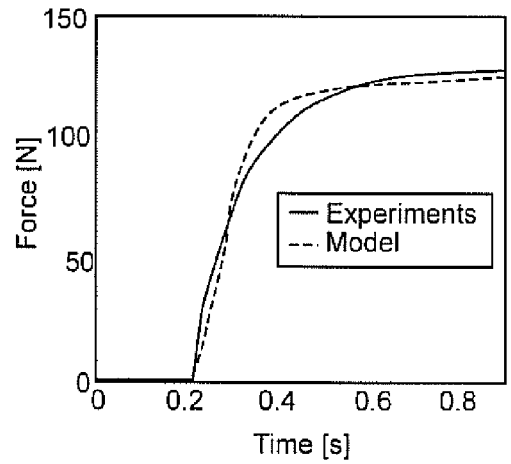

In particular, FIG. 14, plot (a) shows the transient response of the embodiment while plot (b) in FIG. 14 shows a simulated first-order response overlaid on the experimental data at 0.6 A. The force output resembles a typical first order system response. The time it takes the braking force to reach 63.2% of its final value took about 120 milliseconds, which is the time constant of the example reduced to practice MR-brake disclosed herein. This behavior remained the same even when different current levels are used.

Mixed Input and Cyclical Response

Figure 15A:
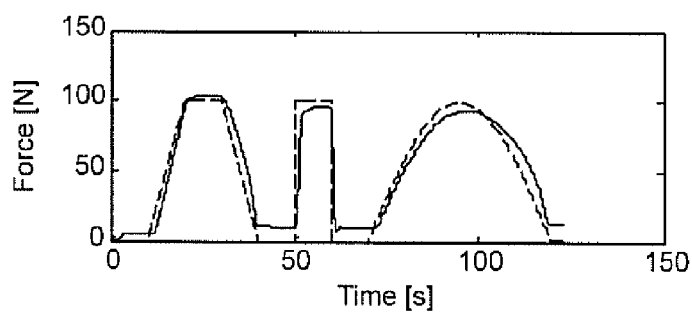
FIG. 15A-B shows force response and current versus time plots of an example linear MR-brake, as disclosed herein.
Figure 15B:
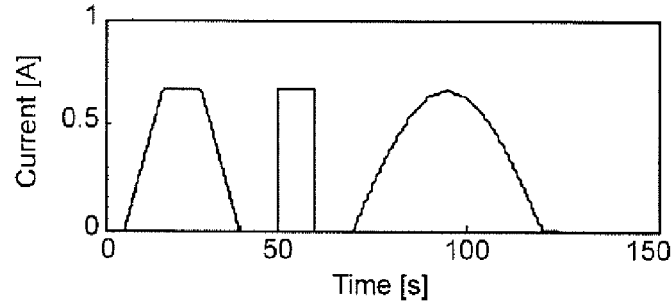

Finally, FIG. 15 shows the results of mixed input following. In this configuration, the rod of the MR-brake is provided with a constant speed profile for motion while a mixed input profile for force command (current) is sent to the control system. A trapezoidal input followed by a step and sinusoidal inputs is then tested. Due to the hysteresis, the force did not turn off completely but the brake was able to follow the input consistently. The maximum force error was about 14%.

Figure 16:
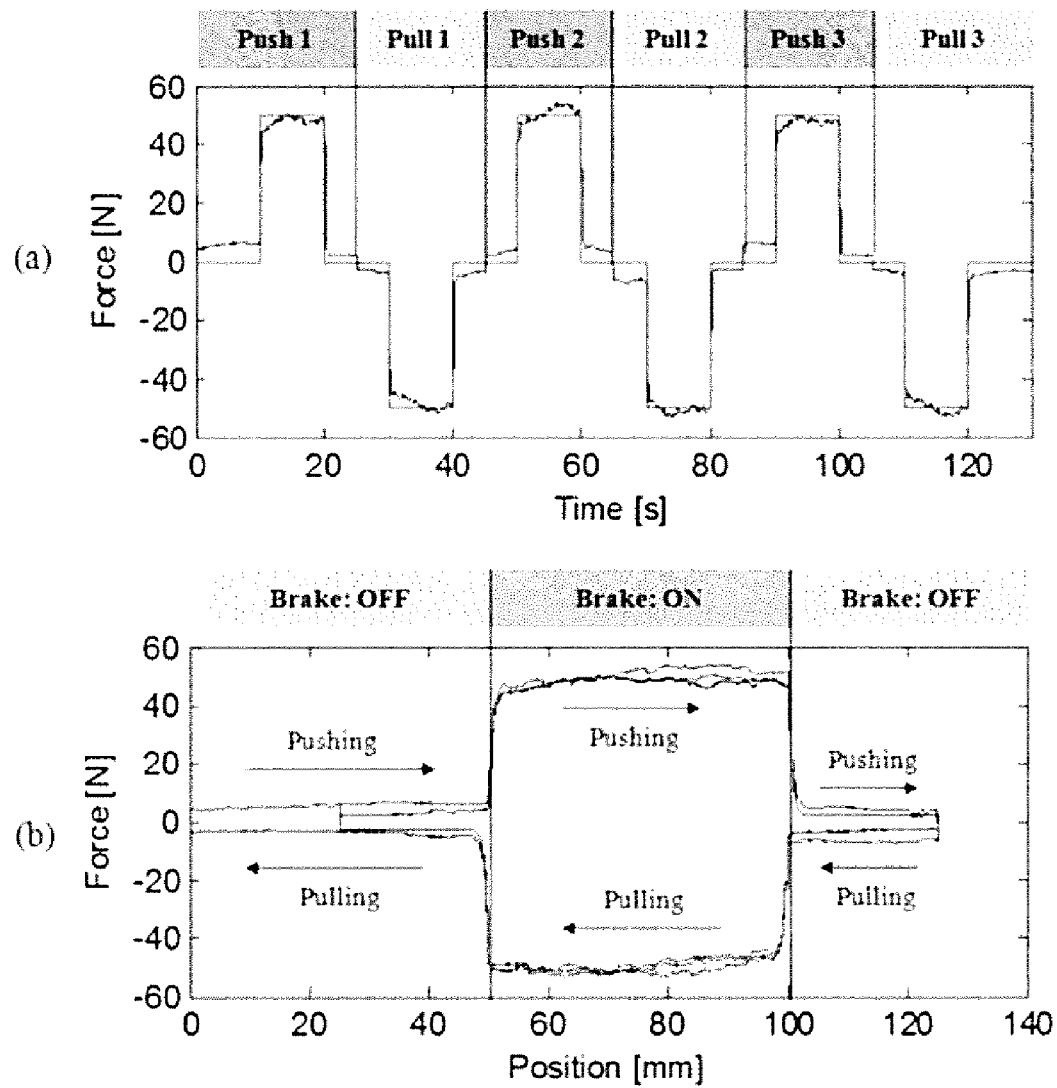
FIG. 16A-B shows push-pull plots of an example linear MR-brake, as disclosed herein.

FIG. 16 (a) and (b) shows the results of cyclical push-pull experiment. The performance of the brake has remained consistent but the effect of the hysteresis can be seen around zero force level.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

The invention claimed is:

1. A magneto-rheological (MR) apparatus, comprising:
a rod configured with a constant diameter along the length of the rod;
a housing configured with an axial bore therein, the bore being slightly greater in diameter than the rod so as to circumscribe the rod; wherein the housing is further configured with conductive and nonconductive materials to provide a plurality of serpentine magnetic flux paths; and
a magneto-rheological fluid disposed therebetween the rod and the housing, wherein linear movement of the rod along the axial bore is controlled by application of a magnetic field to the disposed magneto-rheological fluid by way of the plurality of serpentine magnetic flux paths wherein the rod configured with a constant diameter is further configured with conductive material separated by a non-conductive material disposed along the total length of the central axis of the rod, and
wherein the non-conductive material disposed along the length of the central axis of the rod is configured to aid the directed flow of the plurality of serpentine magnetic flux paths.

2. The magneto-rheological (MR) apparatus of claim 1, wherein the non-conductive material configured in the housing aids the directed flow of the plurality of serpentine magnetic flux paths.

3. The magneto-rheological (MR) apparatus of claim 1, wherein at least two field generator coils are also arranged within the housing so as to be positioned on opposing sides of the rod, wherein a current flow provided to the field generator coils enables the applied magnetic field.

4. The magneto-rheological (MR) apparatus of claim 1, wherein the difference in diameter of the rod and the slightly large diameter of the axial bore of the housing provides for a narrow fluid gap.

5. The magneto-rheological (MR) apparatus of claim 4, wherein the rod is configured with a constant diameter in combination with the configured thickness of an MR-fluid as disposed within the narrow fluid gap to reduce viscosity and enable an off-state friction force of less than about 5.4 N.

6. The magneto-rheological (MR) apparatus of claim 3, wherein a controller is configured to apply a reverse current pulse to the arranged magnetic field generators coils within the housing to further reduce the off-state friction force and reduce hysteresis.

7. The magneto-rheological (MR) apparatus of claim 4, wherein the configuration of the serpentine flux path and the constant diameter of the rod as coupled with the configured thickness of an MR-fluid disposed within the narrow fluid gap, enables a dynamic range of around 30.1 dB and 167.9 N of controllable force.

8. A magneto-rheological (MR) method of operation, comprising:
providing a rod configured with a constant diameter along the length of the rod;
providing a housing configured with an axial bore therein, the bore being slightly greater in diameter than the rod so as to circumscribe the rod; wherein the housing is further configured with conductive and nonconductive materials to provide a plurality of serpentine magnetic flux paths;
inducing a magnetic flux to flow along the conductive materials in the housing;
directing the magnetic flux to flow through a fluid gap configured with magneto-rheological (MR) fluid;
impeding the magnetic flux flow by way of a non-conductive material disposed along the total length of the central axis of the rod;
directing the magnetic flux flow back through the fluid gap, wherein the magnetic flux flow is thereafter impeded by the non-conductive material configured in the housing; and
directing the magnetic flux flow back through the fluid gap and along flow paths provided by the conductive material housing, wherein the magnetic flux flow is directed multiple times through the MR-fluid residing in the fluid gap so as to provide the plurality of serpentine magnetic flux paths and enable linear control of the rod.

9. The magneto-rheological (MR) method of claim 8, further comprising: providing a controller configured to apply a reverse current pulse to arranged magnetic field generators within the housing to further reduce an off-state friction force and reduce hysteresis.

10. The magneto-rheological (MR) method of claim 8, further comprising: providing an off-state friction force of less than about 5.4 N.

11. The magneto-rheological (MR) method of claim 8, providing a dynamic range of around 30.1 dB and 167.9 N of controllable force.

* * * * *